Patented Feb. 21, 1928.

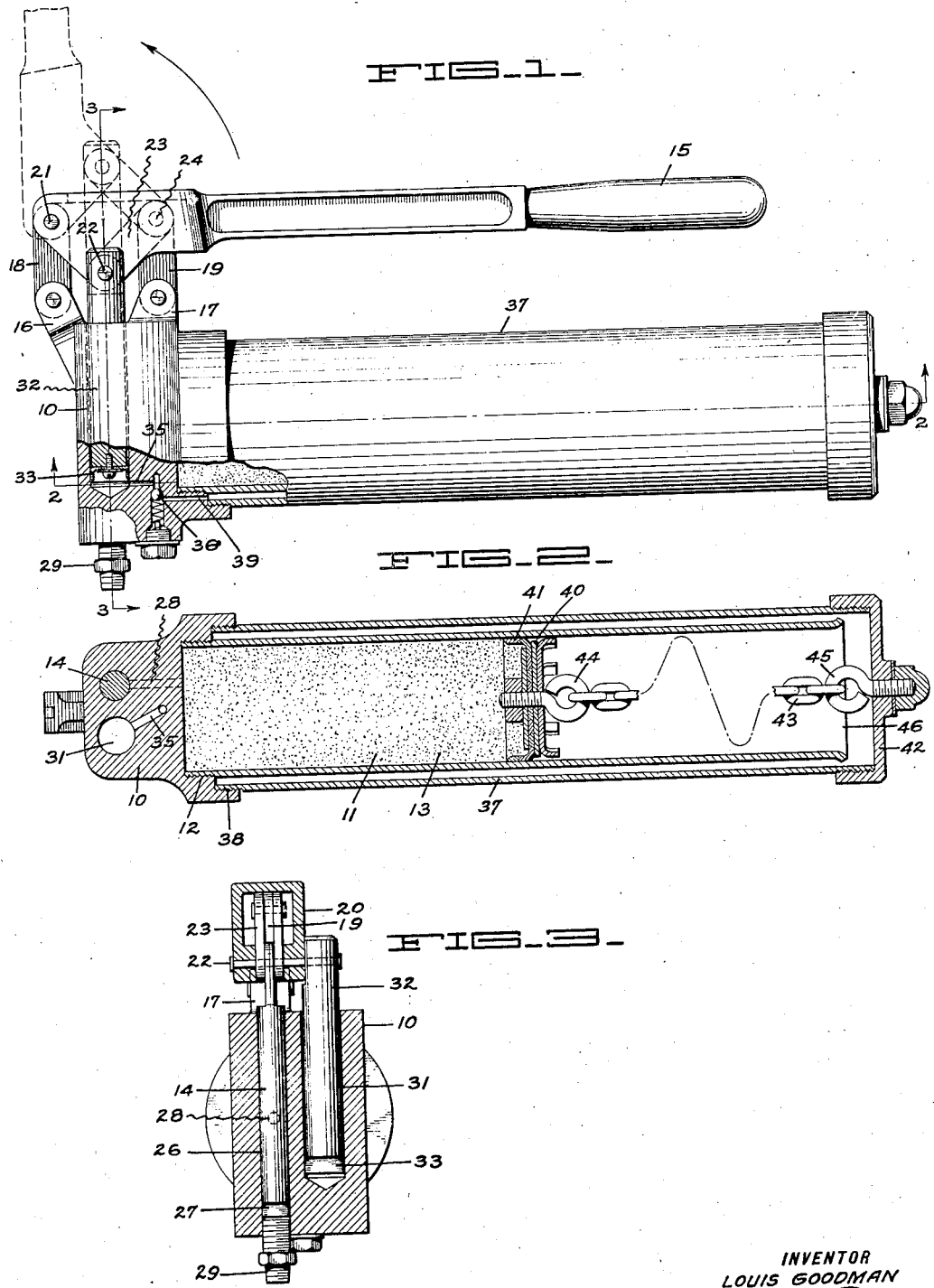

1,659,950

UNITED STATES PATENT OFFICE.

LOUIS GOODMAN, OF SAN FRANCISCO, CALIFORNIA.

GREASE-DISPENSING DEVICE.

Application filed November 21, 1925. Serial No. 70,483.

This invention relates to devices which are employed to dispense lubricating grease into bearings at high pressures. Such devices are commonly known as grease guns and are generally used for lubricating the bearings of motor vehicles. They are usually constructed so that they may be detachably secured to the bearings and are provided with a grease chamber together with means for discharging the grease from the chamber at high pressure.

It is an object of this invention to construct a dispensing device of this class in which means is provided for automatically feeding grease from the grease chamber into the high pressure means for discharging the same. It is proposed to actuate the feeding means through the instrumentality of the same hand lever which is employed to actuate the high pressure means.

It is a further object of this invention to employ pneumatic pressure for feeding grease from the grease chamber to the means for discharging the grease at high pressure, and to automatically maintain this pneumatic pressure upon actuating the high pressure discharging means. It is proposed to provide an air pump for pumping the air into the grease chamber, a plunger for discharging the grease at high pressure and a single hand lever for operating both pump and plunger.

It is a further object of this invention to construct a grease dispensing device in which a common hand lever actuates both the feeding mechanism and the high pressure discharging means and in which the high pressure discharging means is in the form of a plunger disposed transversely of the grease chamber and adjacent one end thereof.

It is a further object of this invention to provide means for preventing the air pressure from blowing through the body of the grease. It is proposed to provide a follower on the surface of the grease which is adapted to carry the pressure of the air.

Further objects of the invention will appear from the following description in which the preferred embodiment of the invention has been set forth.

Referring to the drawings:

Figure 1 is a side elevation of the device of this invention, certain parts being shown in section.

Fig. 2 is a section along the line 2—2 of Fig. 1.

Fig. 3 is a section along the line 3—3 of Fig. 1.

The device comprises generally a body portion 10 to which is suitably secured a grease chamber 11 as by means of a threaded engagement 12. The grease chamber 11 is adapted to contain a charge of grease 13 and means are provided on the body portion for expelling grease from the device at high pressure and for causing grease from the chamber 11 to be automatically fed into the means for discharging the grease. The means for discharging grease at high pressure comprises a reciprocating plunger 14 which may be actuated by means of a hand lever 15.

As shown in Fig. 1, the hand lever 15 is operatively connected to the plunger 14 by means of a plurality of links. Thus the body portion is provided with a pair of bifurcated lugs 16 and 17 to which are pivotally secured the links 18 and 19 respectively. The hand lever 15 is provided with a bifurcated end portion 20, one end of which is pivotally secured to the link 18 as by means of a pin 21. The lower end of this bifurcated portion is pivotally secured to the plunger 14 as by means of a pin 22. The link 19 at its upper end is pivotally secured to the link 23 by means of a pin 24 and the link 23 is in turn pivotally connected to the pin 22. The arrangement of the links is such that the angle made by the line of centers of the pivot pin 24 and the pin 22 with the horizontal is substantially equal to the angle made by the line of centers between the pivot pin 21 and the pin 22 with the horizontal. By means of this mechanism the leverage obtained by the hand lever 15 increases as it approaches the end of its downward stroke and therefore very high pressures can be obtained.

The high pressure plunger 14 is disposed transversely of the grease chamber 11 and is adapted to reciprocate within the bore 26. In order to make a fluid-tight fit with the bore 26 it is preferably provided with a cup washer 27 at its lower end. The bore 26 is adapted to receive grease from the chamber 11 through the port 28 which is provided within the body portion and is adapted to discharge the grease at high pressure through the discharge fitting 29.

The means for automatically feeding the grease from the grease chamber through the outlet 28 comprises generally an air pump which is also actuated by means of a hand lever 15 and which is adapted to pump air into the grease chamber to place the grease under the fluid pressure. Thus a relatively larger bore 31 is provided in the body portion 10 and arranged adjacent to and parallel to the bore 26. Disposed in this bore there is a piston 32 which is provided with a cup washer 33 at its lower end whereby it will make an air tight fit with the bore. The fit between the piston 32 and the bore 31 is a comparatively loose one so that air may pass down around the piston 32 when the piston is raised. Communicating with the lower portion of the bore 31 there is an outlet port 35 which is controlled by means of a suitable check valve 36. In order to convey the air to the open end of the grease chamber 11 the grease chamber is entirely surrounded by means of a threaded cylindrical casing 37 which is detachably secured to the body portion 10 by any suitable means such as a threaded engagement 38. The inner surface of the casing 38 is spaced from the outer surface of the grease chamber 11 and is in communication with the check valve 36 by means of a port 39. Thus air which is pumped by means of the piston 32 is adapted to pass around the grease chamber 11 and into the open end thereof to press downward upon the body of the grease 13. The outer end of the piston 32 is preferably pivotally connected to the same pin 22 which pivotally connects the plunger 14 to the hand lever 15 whereby manual operation of the hand lever 15 will actuate both the high pressure plunger and the air pump piston.

While the device as above described comprises an operable combination it is preferable to provide some sort of means to prevent the air from blowing down through the body of the grease 13. Thus there is provided a follower 40 including a cup washer 41 which fits within the cylindrical grease chamber 11 and is adapted to rest upon the surface of the body of grease 13. In order to provide means for withdrawing this follower from the grease chamber to allow a fresh charge of grease to be inserted, the follower is preferably connected to the outer end 42 of the casing 37 as by means of a flexible connection such as a chain 43 having its one end connected to eye bolt 44 provided on the follower 40 and its other end connected to an eye bolt 45 mounted upon the outer end 42. The chain 43 is made sufficiently long that the follower may travel down to the end of the grease chamber 11. Then to remove the follower for the purpose of inserting a new charge of grease either the casing 37 may be removed from the body portion 10, or the end portion 42 may be removed from the casing 37 and the follower 40 retracted from the grease chamber 11. To facilitate entrance of the cup washer 41 into the end of the grease chamber 11 the outer end of this chamber is provided with a belled portion 46.

In operation a charge of grease is placed within the chamber 11 and the follower 40 positioned adjacent its outer surface. Operation of the hand lever 15 then performs two separate functions. By reciprocating the air piston 32 it causes an air pressure to be built up in the grease chamber 11 to press upon the follower 40 and place the grease charge under a fluid pressure to cause the grease to be fed through the outlet port 28 and operates the plunger 14 to discharge grease at high pressure thru the outlet fitting 29. The provision of the outer casing 37 protects the grease chamber 11 and makes it possible to obtain access to the grease chamber without causing the compressed air to scatter grease over the operator when the parts are first disconnected.

It is to be understood that the word "grease" as used in the specification and claims refers to any lubricating material, whether a liquid or a semi-liquid.

I claim:

1. A grease dispensing device comprising a body member, a grease chamber mounted on said body member, an air pump mounted on said body member and adapted to discharge air in said grease chamber, means including a high pressure plunger in said member adapted to receive grease from said chamber and discharge the same thru an outlet, and means including a single manually operable lever for actuating both said pump and plunger.

2. A grease dispensing device comprising a grease chamber having an outlet opening, means for discharging air under pressure in said chamber to force grease thru said outlet, means for discharging grease at high pressure adapted to receive grease forced thru said outlet, and common operating means for manually operating both said means for discharging air and said means for discharging grease at high pressure.

3. A grease dispensing device comprising means for discharging grease at high pressure, pneumatic means for feeding grease at a substantially lower pressure into said means, and means including a common operating member for manually effecting operation of said first two means simultaneously.

4. A grease dispensing device comprising means for discharging grease at high pressure, pneumatic means for feeding grease into said means, and means including a single manually operable lever for effecting operation of both of said first two means.

5. A grease dispensing device comprising a grease chamber, pneumatic means for expelling grease from said chamber, means for discharging said expelled grease at high pressure, a single hand lever, and means connecting said hand lever with both said first two means whereby they are both actuated by operation of said lever.

6. A grease dispensing device comprising an elongated grease chamber, a high pressure pump having its inlet connected with said chamber and its plunger disposed transverse of said chamber and adjacent one end of the same, said plunger being adapted to discharge grease expelled from said chamber, a pivoted hand lever arranged to extend longitudinally of said chamber and operably connected with said plunger, and means also operably connected to said lever for pneumatically expelling grease from said chamber.

7. A grease dispensing device comprising a body member, a combination air and grease pump disposed in said member, a grease chamber secured to said member and adapted to receive air from said pump and to feed grease to said pump, and an operating lever for actuating said pump whereby grease is forced out of said chamber by pneumatic pressure and discharged from said device at high pressure.

8. A grease dispensing device comprising a shell adapted to contain a charge of grease, a hand lever pivotally secured to said shell, means operated by said hand lever for maintaining a fluid pressure on said grease, an outlet from said chamber, high pressure discharging means in communication with said outlet and means for operatively connecting said high pressure means with said lever.

9. A grease dispensing device comprising a grease chamber, pneumatic means for feeding grease from said chamber, means for discharging the grease fed from said chamber at high pressure, and means including a single hand lever for actuating both said means.

10. In a grease dispensing device, a body portion, a pneumatic pump disposed in said portion, a grease pump likewise disposed in said portion, a single lever for actuating both of said pumps, and a grease chamber secured to said body portion, said chamber being in communication with the outlet of the air pump and the inlet of the grease pump.

11. In a grease dispensing device, a body portion, a grease chamber mounted on said body portion, a pneumatic pump disposed within said portion and having its discharge outlet communicating with said chamber, a grease pump likewise disposed within said portion and having its intake communicating with said chamber, and a common actuator for both of said pumps.

In testimony whereof, I have hereunto set my hand.

LOUIS GOODMAN.